(12) United States Patent
Pougnard (10) Patent No.: US 12,065,187 B2
(45) Date of Patent: Aug. 20, 2024

(54) METHOD FOR MANUFACTURING A STEERING WHEEL

(71) Applicant: Autoliv Development AB, Vargarda (SE)

(72) Inventor: Christophe Pougnard, Maille (FR)

(73) Assignee: Autoliv Development AB, Vårgårda (SE)

( * ) Notice: Subject to any disclaimer, the term of this patent is extended or adjusted under 35 U.S.C. 154(b) by 274 days.

(21) Appl. No.: 17/593,107

(22) PCT Filed: Mar. 11, 2020

(86) PCT No.: PCT/EP2020/056439
§ 371 (c)(1),
(2) Date: Sep. 9, 2021

(87) PCT Pub. No.: WO2020/187655
PCT Pub. Date: Sep. 24, 2020

(65) Prior Publication Data
US 2022/0185357 A1    Jun. 16, 2022

(30) Foreign Application Priority Data

Mar. 15, 2019   (FR) .................. FR1902704

(51) Int. Cl.
*B62D 1/04*    (2006.01)
*B29C 45/00*   (2006.01)
(Continued)

(52) U.S. Cl.
CPC .......... *B62D 1/046* (2013.01); *B29C 45/0017* (2013.01); *B29C 45/0081* (2013.01);
(Continued)

(58) Field of Classification Search
CPC ....... Y10T 29/49488; B29L 2031/3047; B62D 1/04; B62D 1/046; B62D 1/06;
(Continued)

(56) References Cited

U.S. PATENT DOCUMENTS 6,126,123 A * 10/2000 Yang ................... B60R 16/0215
                                                         248/74.1
2003/0075003 A1    4/2003 Tanabe et al.
(Continued)

FOREIGN PATENT DOCUMENTS

WO    2017126448 A1    7/2017
WO    WO-2019122247 A1 *  6/2019  ......... B29C 45/0081

OTHER PUBLICATIONS

Translation of WO2019122247 (Year: 2019).*

*Primary Examiner* — Matthew P Travers
(74) *Attorney, Agent, or Firm* — Matthew D. Thayne; Thayne and Davis LLC (57) ABSTRACT

The invention relates to a method for manufacturing a steering wheel comprising a frame, a covering formed by a body, overmoulded onto the frame, and at least one insert, the method comprising steps aimed at: providing at least one recess in the covering, and producing the insert so that an assembly of the insert with the body of the covering allows the recess, to be at least partially covered, wherein the insert is obtained in a single piece with the body of the covering.

14 Claims, 4 Drawing Sheets

(51) Int. Cl.
  *B29C 45/14* (2006.01)
  *B29L 31/30* (2006.01)
  *B62D 1/06* (2006.01)

(52) U.S. Cl.
  CPC ............ *B29C 45/1459* (2013.01); *B62D 1/06* (2013.01); *B29L 2031/3047* (2013.01)

(58) Field of Classification Search
  CPC . B29C 44/12; B29C 44/1266; B29C 44/1271; B29C 45/0017; B29C 45/0081; B29C 45/14; B29C 45/1459; B29C 45/14819
  See application file for complete search history.

(56) References Cited

U.S. PATENT DOCUMENTS

| | | |
|---|---|---|
| 2012/0006148 A1 | 1/2012 | Nagata |
| 2014/0026711 A1* | 1/2014 | Bertrand .................. B62D 1/06 74/558 |
| 2014/0301097 A1 | 10/2014 | Neumann et al. |
| 2018/0015941 A1 | 1/2018 | Hino |
| 2020/0148247 A1 | 5/2020 | Maekubo et al. |

* cited by examiner

METHOD FOR MANUFACTURING A STEERING WHEEL

TECHNICAL FIELD

The present invention generally relates to the field of vehicles, particularly the field of steering wheels such as those for motor vehicles, for example.

A steering wheel typically consists of a frame comprising a hub from which spokes extend that connect the hub to a core or rim, which forms the circular or essentially circular part of the steering wheel. Forming the backbone or skeleton of the steering wheel, the frame may be obtained by injection under pressure of a light metal, such as aluminum or magnesium. This frame can then be overmoulded by a urethane foam obtained for example from a polyurethane elastomer (PU, PUR).

In language commonly used by those skilled in the art, the overmoulding of the frame constitutes the foaming operation of the steering wheel. This operation is carried out by placing the frame in a mould generally formed of two parts, one lower, the other upper. The mould comprises the steering wheel cavity that may be filled with a casting (one or several chemicals in liquid form) injected under pressure through feed channels under predefined temperature and pressure conditions. By chemical reaction, these conditions will allow the casting to change to foam, to solidify and harden after a certain time in order to form the rough covering of the frame.

This covering will essentially cover the circular or substantially circular part of the steering wheel, but may also extend to the spokes. Once out of the mould, this covering will be deburred especially in order to remove the excess foam cast around the steering wheel. Finally, the steering wheel may then be covered by a sheath, which may typically be made of natural or artificial leather, for example. This last operation is generally done manually by workers who apply glue to the covering, stretch the leather sheathing and sew it closed.

As is well known, steering wheels are currently equipped with control buttons, often even sensors, for the purpose of improving safety during driving, particularly by facilitating access to certain functionalities without releasing the steering wheel. These control buttons and other equipment need to be electrically supplied and connected by means of electric wires concealed in the steering wheel, particularly in the covering thereof and more specifically in channels left on the surface of the covering by the operation of overmoulding the frame (foaming).

The problem caused by these channels lies in the fact that when the sheathing is applied to the steering wheel, the electric wires arranged in these channels can be felt through the sheathing that has been deliberately stretched to conform to the shape of the steering wheel. If the electric wires or cables protrude from the channel, or conversely, if they are inset too far from the surface of the covering or do not completely fill the channel in which they are placed, ridges or deformations may be felt after application of the sheath.

Furthermore, the injection method and the movements of the two mould parts during injection operations restrict the positioning of the channels on the steering wheel so that they are not necessarily arranged where they will be the most unobtrusive. Their positions must allow the demoulding of the steering wheel, and minimum injection thicknesses must be respected.

From a functional point of view, it is important that the steering wheel be well-made in order not to compromise the safety of users. However, the steering wheel must also be pleasant to the touch and of flawless aesthetics and ergonomics for the pleasure and comfort of the driver. In any case, the steering wheel constitutes an important element in the interface between the steering mechanism of the vehicle and the driver.

PRIOR ART

Document US 2003/0075003 discloses a steering wheel capable of giving the impression that it is formed from a pattern and texture of natural wood, both from a visual aspect as well as tactile feel. In one embodiment, the covering of the steering wheel of this document is produced from two parts. The first part is a main portion that adopts a C-shaped cross-section in order to be inserted onto the core or the rim of the frame. This first part constitutes the front face of the covering. The second part is situated on the back face and involves an insert intended to close the open portion of the C-shape left by the first part While seeking to improve the comfortable feel of the steering wheel so that it is pleasant for the driver to hold, the solutions of the prior art do not make it possible to efficiently resolve the problem of ridges or deformations resulting from a sheathing applied onto a covering in which recesses or channels have been made for arranging members therein such as electric wires.

Consequently, there is a benefit in finding a more appropriate and efficient solution that makes it possible, at least in part, to resolve the aforementioned disadvantages.

DISCLOSURE OF THE INVENTION

To that end, the present invention relates in a first aspect to a method for manufacturing a steering wheel comprising a frame, a covering formed by a body, overmoulded onto the frame, and at least one insert, said method comprising steps aimed at:

providing at least one recess in the covering, and
producing said insert so that an assembly of the insert with the body of the covering allows the recess to be at least partially covered, characterised in that said insert is obtained in a single piece with the body of the covering.

Advantageously, the recess provided in the covering constitutes a space that may be partially occupied by one or several non-structural members such as electric wires, for example. However, this space may also be fully occupied or left empty. Irrespective of the degree of occupancy or of filling of the space by such a member, the coverage of the space by the insert during assembly makes it possible to obtain a covering provided with a continuous or homogenous surface. Such a surface allows an optimal sheathing to be ensured, free of any ridges, folds, indentations or other deformations once the sheath is applied and stretched onto the covering.

More advantageously, the method of manufacturing this covering is particularly efficient because it makes it possible to obtain the expected result with a minimum of expense or effort. Indeed, because the insert and the body of the covering are obtained in a single piece, it is not necessary to use more than one moulding operation to obtain all the parts of the covering since it makes it possible to obtain simultaneously an overmoulding of the frame and at least one insert related to this overmoulding. More advantageously, it is no longer necessary to multiply the channels for feeding the material injected into the mould; since the body of the covering and the insert are of one piece, they are necessarily connected to one another, thus constituting one and the same cavity in the mould. Moreover, because the inserts are injected at the same time as the rest of the foaming, it becomes possible to guarantee that all the elements from the foaming will have the same pliability and will have similar injection characteristics. Also, during handling or transport of the steering wheel, it is advantageously no longer possible to misplace the insert without it being deliberately detached from the body of the covering. Finally, this makes it possible to manufacture only one part and therefore manage only one part reference.

In a preferred embodiment, the insert is obtained by being attached to the body of the covering by at least one attachment bridge.

In another embodiment, a depression is further provided in the periphery of the body of the covering and/or of the insert and is configured to be able to receive therein all or part of the attachment bridge.

According to one particular step of the method, the attachment bridge is detached from the insert and/or from the body of the covering.

Furthermore, according to a preferred embodiment the attachment bridge is inserted into said depression. For example and more particularly, the attachment bridge may be inserted into the depression in a movement consisting of folding the insert against the body of the covering. Preferably, the depression in this case is provided in front of the attachment bridge. This embodiment makes it possible to limit the operations of cutting the bridge, thereby saving time, material and avoiding having to manage scrap.

Preferably, said attachment bridge is arranged to form a hinge between the body and the insert, and said manufacturing method comprises an operation of inserting the insert into the recess by folding the attachment bridge forming a hinge. This embodiment eliminates the operation of cutting the attachment bridge, which simplifies the assembly operations.

Preferably, the recess is provided in the body of the covering. However, this recess could be provided in the insert, or even partly in the body of the covering and partly in the insert. Thus, in one embodiment, said recess is at least in part provided in said insert.

More preferably, the depression and/or the recess is obtained during the moulding of the covering.

In one embodiment, the insert has a shape at least partially matching that of the recess.

In one embodiment, the insert is inserted at least partially into the recess. This makes it possible to facilitate the positioning of the insert and ensure better joining of the different parts.

In one embodiment of the invention, the method further comprises the positioning of at least one member in said recess, prior to said assembly of the insert with the body of the covering. Preferably, said member is an electrical member. The method therefore makes it possible to integrate, simply and with great freedom of design, an electrical member such as a wire or set of wires in the foaming of the steering wheel.

In a preferred embodiment, said steering wheel comprises several inserts. The use of several inserts makes it possible to cover a larger surface area of the covering while limiting the size of the injection mould because of the general curvature of the rim.

In one embodiment, the insert or inserts are positioned at the periphery of the covering during their manufacture in a single piece with the body of the covering.

In one embodiment, the body of the covering has a joint plane and said attachment bridge is situated at said joint plane. This embodiment simplifies the design of the injection mould for the covering.

In other words, the insert and the body of the covering are manufactured in the same step of the method, thus forming a single piece. In other words, the insert and the body of the covering are made of the same material.

Consequently, upon completion of a single step of manufacturing the insert and the body of the covering, a part is obtained where the material is continuous between the insert and the body of the covering.

For example, if the manufacturing is carried out by moulding, then at the exit of the mould, the insert and the body of the covering are one and the same part, with a first portion intended to form the insert, and a second portion intended to form the body of the covering, both portions being able to be connected together by bridges, for example.

In a second aspect, the invention relates to a steering wheel obtained by the implementation of the method, relative to the first aspect of the invention, according to any one of the embodiments thereof. Preferably, this second aspect relates to a steering wheel comprising a frame and a covering formed by a body overmoulded onto said frame and at least one insert. This steering wheel is characterised in that the insert and the overmoulded body of the covering are obtained in a single piece.

In one embodiment, one end of an insert is adjacent to a sheathing groove of the covering. A sheathing groove is a hollow shape arranged to receive a seam of a sheath, for example made of natural or synthetic leather, glued and/or sewn at the periphery of the covering. When the end of the insert is adjacent to such a groove, it limits the risks of visibility of the juncture because the seam of the sheath is in this area.

In one embodiment, two ends of an insert are adjacent to two different sheathing grooves of the covering.

In a third aspect, the invention relates to a motor vehicle, comprising a steering wheel that is in accord with the second aspect of the invention.

In a fourth aspect, the invention relates to an injection mould for the implementation of the method, the object of the first aspect of the invention, according to any one of the embodiments of this method or according to any one of the possible combinations of these embodiments.

DETAILED DESCRIPTION

Figure 1:
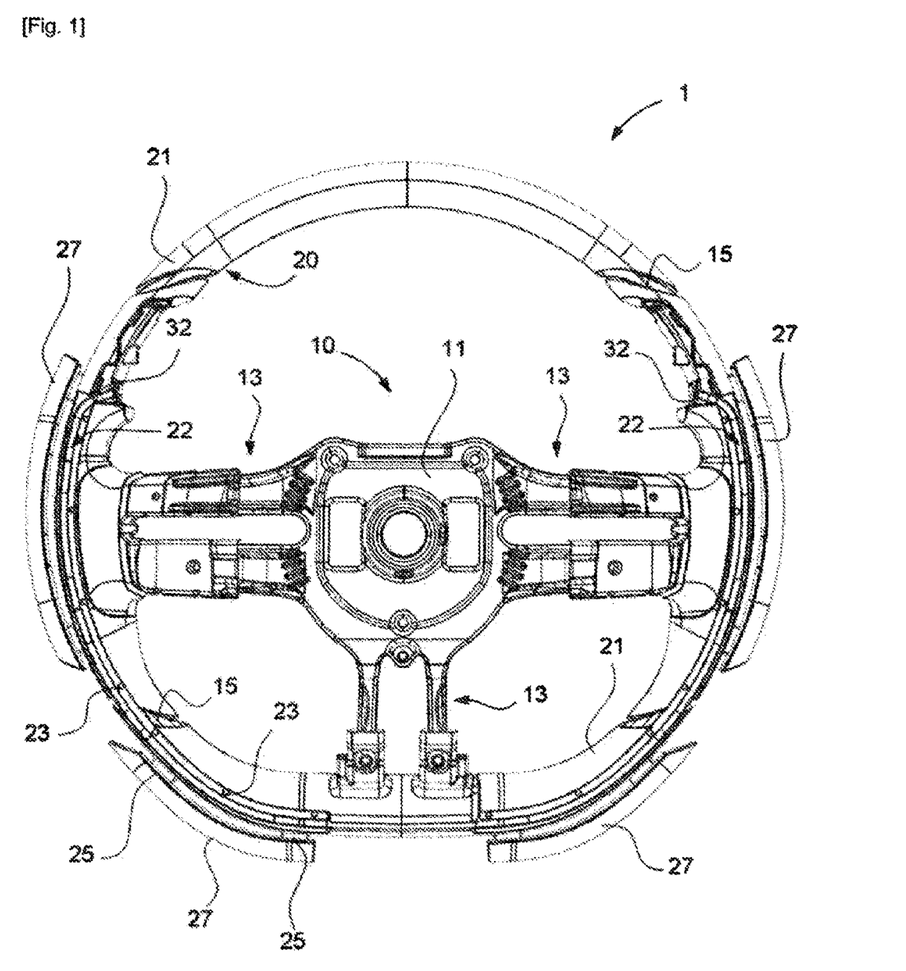
FIG. 1 represents a rear view of a steering wheel according to the invention in which inserts are still attached to the body of the covering.

FIG. 1 represents a plan view of a steering wheel 1 comprising a frame 10 and a covering 20. This steering wheel is typically obtained by overmoulding the frame 10 by the covering 20. Produced from an alloy or a light metal such as magnesium or aluminum, the frame 10 typically constitutes the skeleton or backbone of the steering wheel. This frame comprises a hub 11 from which spokes 13 extend which connect the hub 11 to a core or rim 15. Said rim constitutes the portion of the structure that gives the circular or substantially circular shape to the steering wheel.

The covering 20 essentially consists of a body 21, overmoulded onto the frame, and at least one insert 27. The at least partial overmoulding of the covering on the frame is obtained by moulding. To do this, the frame 10 is placed in a mould that comprises the cavity for the steering wheel 1. This mould is generally formed from two parts, typically an upper half and a lower half, and comprises injection channels that enable a material to be injected, such as a urethane foam (PU, PUR) for example. The operation of moulding the steering wheel, namely the at least partial overmoulding of its frame, is also called foaming by those skilled in the art. After a certain time and under certain temperature and pressure conditions, the injected foam will solidify, then harden.

It can be seen in FIG. 1 that the covering 20 is formed not only of the body 21 but also of at least one insert 27, preferably a plurality of inserts, of which there are four in this example. These inserts 27 constitute mating parts of the body of the covering and are related thereto in order to be able to complete it.

The method of manufacturing the steering wheel of the present invention especially comprises steps aimed at:
 providing at least one recess 22 in the covering 20, and
 producing said at least one insert 27 so that an assembly of the insert 27 with the body 21 of the covering allows the recess 22 to be at least partially covered.

According to the method of the invention, the insert 27 is obtained in a single piece with the body 21 of the covering. This feature is better shown in FIG. 2, which represents a part of the steering wheel 1 and more specifically a perspective view of a portion of the steering wheel in front of one of the inserts 27.

The recess 22 (more visible in FIG. 2) will allow the arrangement of at least one member 32 in the body 21 of the covering of the steering wheel. In the example of FIG. 1, this member 32 consists of electric wires, in particular a strand of electric wires, that may be connected for example to a control button 35 of the steering wheel 1 (FIG. 3). Such a control button 35 may typically be used to control a device of the vehicle in order to activate for example an audio function, a remote wireless connection, a speed regulator, an onboard computer or any other apparatus.

Advantageously, the recess 22 provided in the covering 20 offers a space that may either be left free or occupied, in other words partially or totally occupied, by at least one member 32 without producing an undesirable surface effect of the covering 20. Consequently, any sheath 41 (FIG. 4) applied stretched onto the covering 20 will not leave any deformation such as a ridge, crevice or fold to be felt.

More advantageously, as a result of the manufacturing method of the present invention, the aforementioned benefit may further be obtained particularly efficiently. This results especially from the fact that each insert 27 of the covering can be advantageously obtained in a single piece with the body of the frame during the overmoulding of the frame, i.e., in one and the same operation. Furthermore, obtaining the covering of the frame in one piece requires no additional injection of material. More advantageously, obtaining this covering in one piece, including inserts 27 capable of being detached from the body 21 facilitates the transport, handling, storage and tracing of the elements of the covering in the production line. Typically, obtaining the insert (or inserts) and the body in one piece is achieved by moulding.

Figure 2:
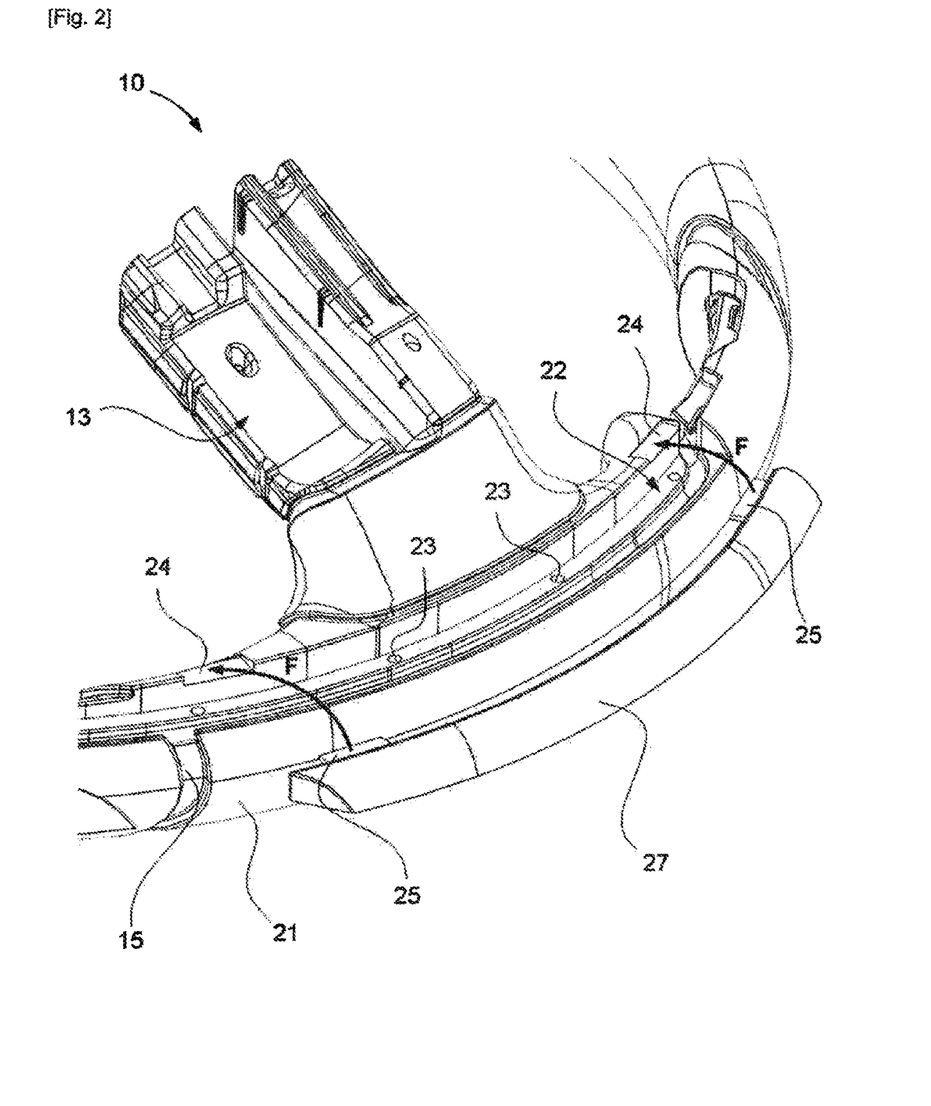
FIG. 2 represents a view in perspective of a more detailed portion of the steering wheel in front of one of said inserts.
Figure 3:
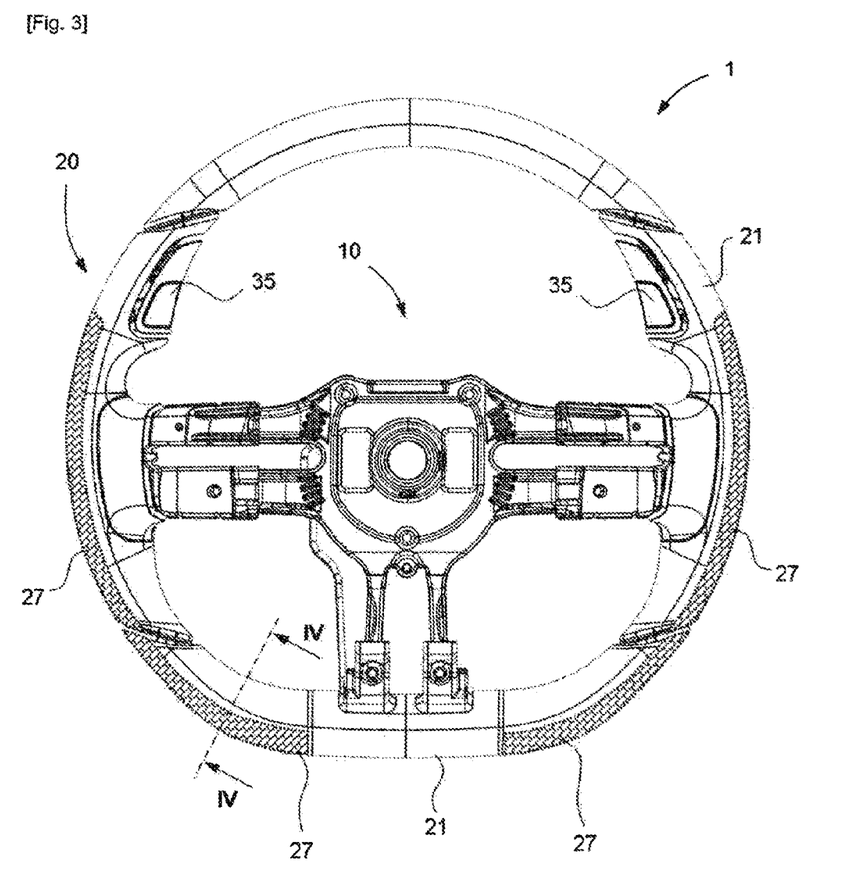
FIG. 3 represents a steering wheel in a view similar to that of FIG. 1, but at a later stage in which the inserts have been assembled onto the body of the covering in order to cover a recess.

In one embodiment, as shown by example in FIG. 2, the insert 27 is obtained by being attached to the body 21 of the covering 20 by at least one attachment bridge 25. This bridge can be considered as being a transition or a connection element that makes it possible to obtain, in a single piece, a covering formed of a body 21 and at least one insert 27 connected to this body. As shown in this figure, two attachment bridges 25 are preferably used to attach each complementary part or insert 27 to the body of the covering during production of this insert with this body. More preferably, the attachment bridge 25 comprises two ends, one adjoined to the body and the other adjoined to the insert. Alternatively, it would be possible to obtain a connection bridge with more than two ends, for example a Y-shaped attachment bridge comprising three ends, or H-shaped with four ends. According to another alternative, it would also be possible to consider an attachment bridge with one end if said bridge were in the shape of an I and would simply be a wire disposed longitudinally along the body and the insert connected thereto.

Furthermore, in one embodiment best viewed in FIG. 2, a depression 24 is made in the periphery of the body 21 and is configured to be able to accommodate therein or to insert therein all or part of the attachment bridge 25. It will be understood that there will preferably be as many depressions 24 as there are attachment bridges in the covering 20. This depression can be an indentation having a shape complementary to that of the attachment bridge, or at least having a shape so that when the insert 27 is assembled onto the body 21 in order to cover the recess 22, the attachment bridge 25 is matched and integrated (preferably freely) with the body 21.

Alternatively, the depression 24 could, for the same purpose, be provided in the periphery of the insert 27, even partially in the periphery of the body 21 and partially in the periphery of the insert 27.

In one embodiment, the method of the invention further comprises a step in which the attachment bridge 25 is detached from the insert 27 and/or from the body 21 of the covering. Indeed, in order to be able to assemble the insert 27 and the body 21, several scenarios may be considered.

In a first scenario, the body 21 may be detached from the attachment bridge 25, for example by cutting the end(s) of this bridge that is(are) adjoined to the body 21. In this first scenario, it is advantageously unnecessary to have to separate the attachment bridge 25 from the insert 27 since the body 21 includes a depression 24 specifically making it possible to receive the attachment bridge 25 that remains integral with the insert 27. With reference to FIG. 2, it will be noted that the cutting of a single end of each attachment bridge 25, in this instance the end adjoined to the body 21, enables the release of the insert 27 which, according to the illustration given by the arrows F, will be able to be placed against the body 21 in order to carry out the assembly of the insert with the body. To do this, the depressions 24 will then preferably be provided to match the attachment bridges 25 that remain integral with the insert 27.

In a second scenario, the insert 27 may be detached from the attachment bridge 25, for example by cutting the end(s) of this bridge that is(are) adjoined to the insert 27. In this second scenario, it would be possible to make depressions 24 in the body 21 in positions adjoining the attachment bridges 25. Thus, these bridges could be folded into these depressions 24, particularly during the subsequent operation of sheathing the steering wheel. Furthermore, if necessary, each attachment bridge could be provided with a necking or line of weakness facilitating its folding in order to be folded against its depression, typically matching, at the periphery of the body of the covering.

In a third scenario, both the insert 27 and the body 21 could be detached from the attachment bridge 25. This operation would typically require two cuts to obtain the complete separation of each attachment bridge 25. These attachment bridges will preferably be discarded, but nevertheless could be inserted into the depressions 24 if said depressions are provided in the covering body for that purpose.

In a fourth scenario, it should be noted that the insert 27 and the body 21 may not be detached from the attachment bridge 25. In this case, these bridges would be placed in such a way that, on the one hand the insert may be folded or turned down onto the body 21 during their assembly with the body, and on the other hand in this assembly position each attachment bridge 25 can be received at least in part in a matching depression 24. Thus, there may be an embodiment in which the attachment bridge 25 is inserted into the depression 24, for example by a movement consisting of folding or turning down the insert 27 against the body 21 of the covering.

In one embodiment of this scenario, the attachment bridge 25 could be arranged to form a hinge between the body 21 and the insert 27, and the method would comprise an operation of inserting the insert 27 into the recess 22 by folding the attachment bridge forming a hinge.

Each of these scenarios makes it possible to obtain an assembly of the insert 27 with the body 21 such that the surface of the insert is located in the extension of the surface of the body. The same is true for the surface of the attachment bridge 25 with respect to the surface of the body 21, since, in each of these scenarios, the attachment bridge may be inserted into the depression 24 provided for that purpose. Thus, the surfaces of the body, the insert and if applicable the attachment bridge, may advantageously be in line with one another, so that the covering 20 has, after such assembly, a unified or uniform surface that conceals the recess 22 without leaving deformations on the sheath once the subsequent operation of sheathing the steering wheel has been carried out.

In particular when the body 21 and the insert 27 are not detached from the attachment bridge 25, it may be mentioned that the depression 24 will preferably be made in front of the attachment bridge so that it can easily be inserted thereinto during the assembly of the insert with the body of the covering.

Preferably, the recess 22 is provided in the body 21 of the covering. However, this recess 22 could be provided in the insert 27, or partly in the body 21 and partly in the insert 27. For this reason, it may be mentioned that the recess could be at least partly provided in the insert 27.

Figure 4:
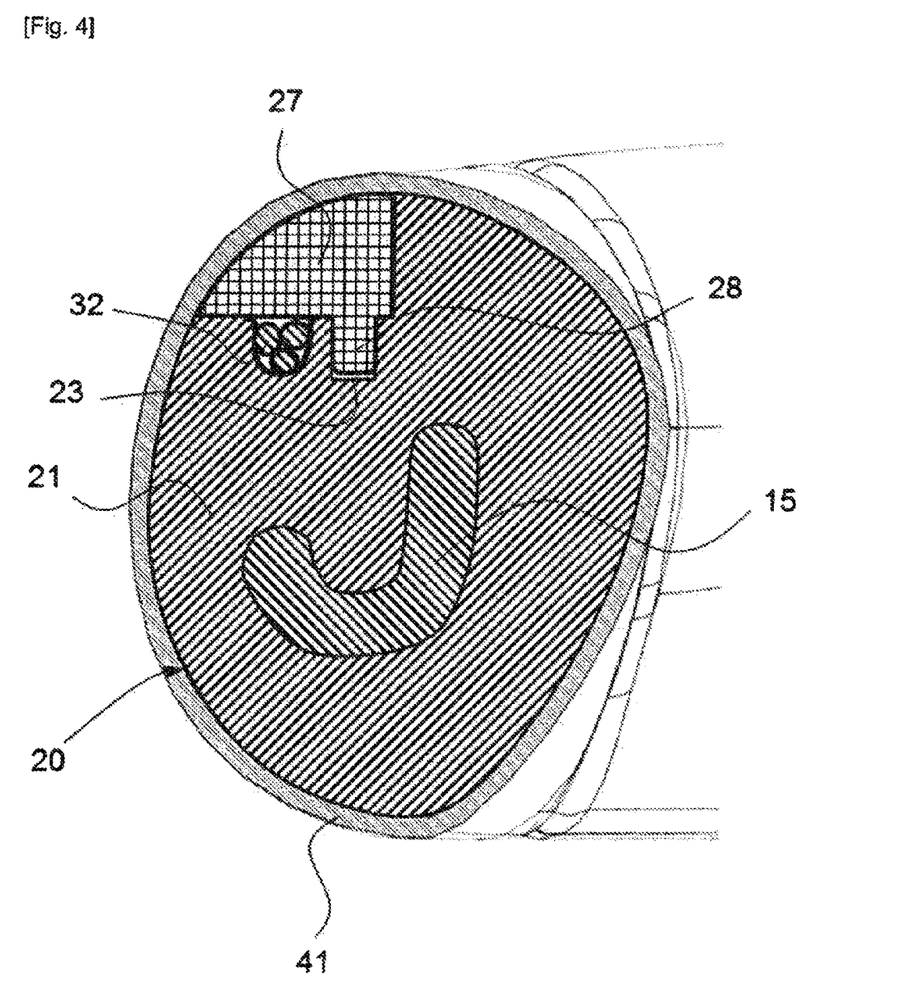
FIG. 4 represents a partial cross-section of the vehicle steering wheel along the line IV-IV of FIG. 3.

In one embodiment, the insert 27 is inserted at least partially into the recess 22. According to a preferred embodiment, the assembly of the insert and the body is carried out by interlocking and/or bonding. To do this, the body of the covering and the insert may further be configured to be assembled to one another. For example, the insert 27 may have a shape at least partially complementary to the recess 22. Alternatively or additionally, the body 21 could comprise blind holes 23 (FIGS. 1, 2 and 4) configured to receive matching pins or other projections 28 (FIG. 4) that are integral with the insert 27. The blind holes 23 may be provided in a host surface of the body 21 intended to receive the insert, typically at the edges of the recess 22 as shown in FIG. 4. However, these blind holes could also be made in the insert and the pins could then be made part of the body of the covering. Of course, other means of interlocking could be preferred in order to carry out the assembly of the insert with the body. These complementary shapes make it possible to facilitate the positioning of the insert and ensure better joining of the different parts.

Preferably, the recess 22 is obtained during the moulding of the covering, namely during the foaming operation. Advantageously, this recess can thus be obtained without requiring a subsequent operation, for example such as milling a portion of the covering 20 in order to create the recess therein. More preferably, and for the same reasons, this is also true for the depression 24.

The method of the present invention may further comprise a step of placing at least one member 32 in the recess 22 prior to assembling the insert with the body of the covering. Preferably, this member 32 is an electrical member, typically one or several electrical conductors or wires.

It may also be mentioned that in one embodiment, the steering wheel 1 preferably comprises several inserts 27.

The method of the invention may further comprise a step of sheathing the steering wheel 1, in particular the covering 20, after having arranged the member 32 in the recess 22 and having proceeded with the assembly of the insert 27 with the body 21. More precisely, this sheathing step is for sheathing the covering, or a portion thereof, obtained by means of a sheath 41 (FIG. 4). This sheath is typically stretched around the covering 20, in other words around the assembly of the insert 27 with the body 21 or around a portion of this assembly. Such a sheath 41 will typically be produced from a flexible material such as leather, for example.

In another embodiment, the step of sheathing the sheath 41 may be preceded by sheathing another element such as a heating element or a presence sensor for example. The presence of such elements between the covering and the outer sheath makes it possible to hide any defect that may remain at the juncture between the insert and the covering.

In a second aspect, the invention also relates to a steering wheel 1 obtained by the implementation of the method of the first aspect, more specifically by any one of the embodiments of this method or any one of the possible combinations of these embodiments. Preferably, this second aspect relates to a steering wheel 1 comprising a frame 10 and a covering 20 which is formed by a body 21, overmoulded onto this frame 10, and at least one insert 27. According to the invention, this steering wheel 1 is characterised in that the insert 27 and the overmoulded body 21 of the covering 20 are formed as a single piece.

In a third aspect, the invention relates to a vehicle, particularly a motor vehicle, comprising a steering wheel 1 that is in accord with the second aspect of the invention.

In a last aspect, the invention also relates to an injection mould for the implementation of the method according to any one of the embodiments of this method or according to any one of the possible combinations of these embodiments.

The invention claimed is:

1. A method for manufacturing a steering wheel comprising a frame, a covering formed by a body, overmoulded onto the frame, and at least one insert, said method comprising:
   providing at least one recess in the covering;
   producing each insert with the body in a single piece so that an assembly of each insert with the body of the covering allows each recess to be at least partially covered, wherein each insert is integrally connected to the body along at least one attachment bridge; and detaching at least a portion of each attachment bridge from at least a portion of a corresponding insert and/or the body.

2. The method according to claim 1, wherein a depression is further provided in a periphery of the body of the covering and/or of each insert and is configured to be able to receive therein all or part of each attachment bridge.

3. The method according to claim 2, further wherein each attachment bridge is inserted into said depression.

4. The method according to claim 1, wherein each recess is provided in the body of the covering.

5. The method according to claim 1, wherein each recess is at least partially provided in a corresponding insert.

6. The method according to claim 1, wherein each insert has a shape at least partially complementary to a corresponding recess.

7. The method according to claim 1, further comprising the positioning of at least one member in each recess prior to said assembly of each insert with the body of the covering.

8. The method according to claim 7, wherein said member is an electrical member.

9. The method according to claim 1, wherein said steering wheel comprises several inserts.

10. The method according to claim 1, wherein the body of the covering has a joint plane and wherein each attachment bridge is situated at said joint plane.

11. The method according to claim 1, wherein the step of detaching at least a portion of each attachment bridge from at least a portion of a corresponding insert and/or the body comprises cutting a single end of each attachment bridge adjacent to the body to enable release of each insert from the body.

12. The method according to claim 1, wherein the step of detaching at least a portion of each attachment bridge from at least a portion of a corresponding insert and/or the body comprises cutting a single end of each attachment bridge adjacent to a corresponding insert to enable release of each insert from the body.

13. A method for manufacturing a steering wheel comprising a frame, a covering formed by a body overmoulded onto the frame, and at least one insert, said method comprising:
   providing at least one recess in the covering;
   producing each insert with the body in a single piece so that an assembly of each insert with the body of the covering allows each recess to be at least partially covered, wherein each insert is integrally connected to the body along at least one attachment bridge; and
   folding at least a portion of each attachment bridge against a depression formed in the body to form a hinge.

14. A method for manufacturing a steering wheel comprising a frame, a covering formed by a body overmoulded onto the frame, and at least one insert, said method comprising:
   providing at least one recess in the covering;
   producing each insert with the body in a single piece so that an assembly of each insert with the body of the covering allows each recess to be at least partially covered, wherein each insert is integrally connected to the body along at least one attachment bridge; and
   cutting an end of each attachment bridge to enable release of each insert from the body.

* * * * *